Nov. 14, 1961     D. R. CHASE     3,008,331
TEMPERATURE SENSING DEVICE
Filed May 1, 1959
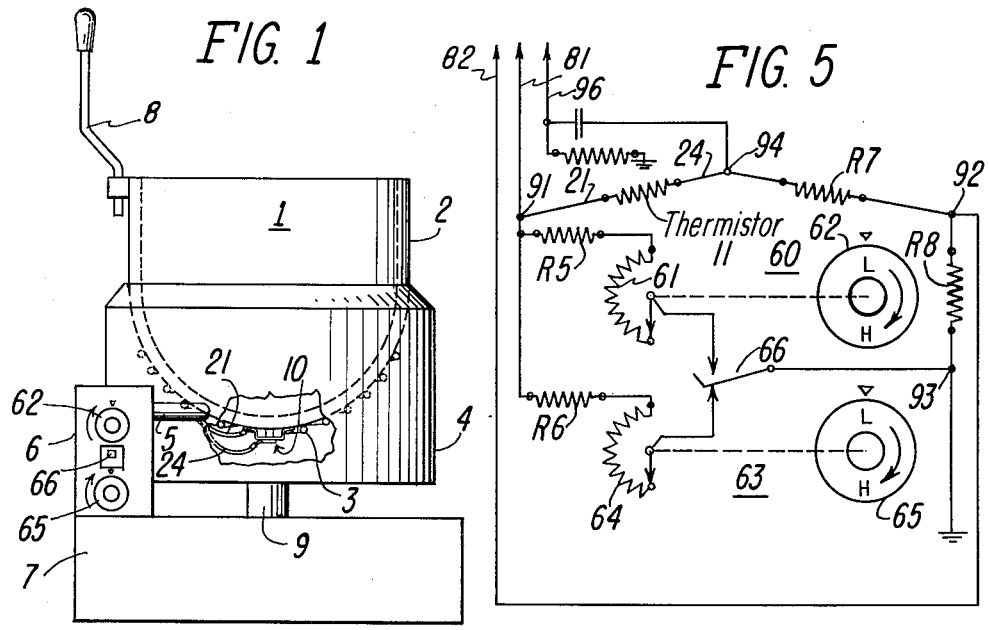
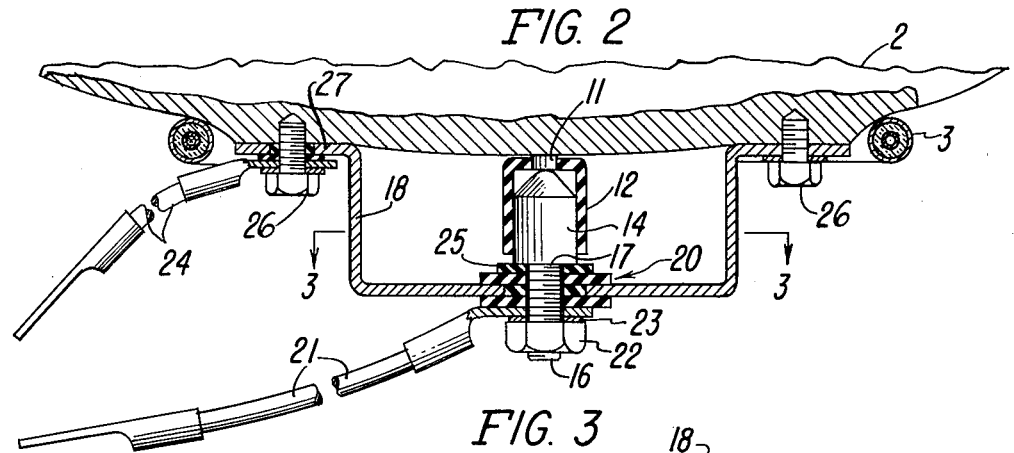
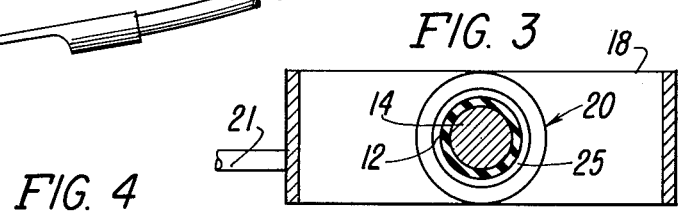
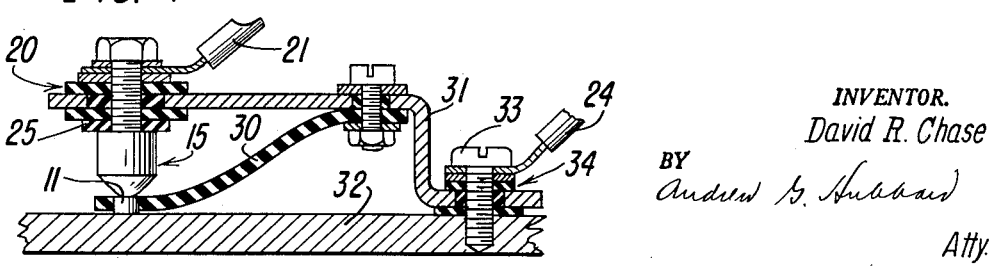
INVENTOR.
David R. Chase
BY
Andrew G. Hubbard
Atty.

3,008,331
TEMPERATURE SENSING DEVICE
David R. Chase, Elmhurst, Ill., assignor to General Electric Company, a corporation of New York
Filed May 1, 1959, Ser. No. 810,396
7 Claims. (Cl. 73—339)

This invention relates to condition responsive apparatus, and in particular, to temperature sensing devices of the type using a sensing element having temperature-resistance characteristics pursuant to which known and repetitive changes of resistance of the sensing element result from an increase or decrease of the temperature of a body in heat transfer relation to the sensing element. Usually, such elements comprise a resistance leg of a Wheatstone bridge circuit in an electrical system effecting control over the means by which said body is heated or cooled.

Sensing elements of the type indicated above are known as "thermistors" and are usually of relatively small size; for example, the thermistor used in the present invention is a disk which is of the order of 0.1 inch in diameter and 0.05 inch thick. The thermistor must be positioned in a manner making it immediately responsive to temperature changes of the body being controlled; and because the thermistor comprises an element of an electrical circuit, it is obvious that electrical connections must be made thereto. It has previously been proposed to embed thermistors in the body of material being tested or controlled, and while this is obviously good as respects heat transfer and similar considerations, servicing problems are grave and it has been difficult to make electrical connections in a manner which keeps the connections insulated one from the other. A washer type thermistor can be fastened to the body with a screw or the like, but the resistance of a thermistor large enough to be handled easily is too low for adequate control response.

It is, therefore, an object of the invention to provide a temperature sensing device embodying a thermistor in which the thermistor is arranged for ease of handling and application to the body being tested.

It is another object of the invention to provide a temperature sensing device of the thermistor type in which the electrical connections to the thermistor are simple to establish and easy to connect into the control circuit.

In accomplishing the above objects in a presently preferred embodiment of the invention, a disk type thermistor is frictionally held within an aperture formed in an insulated mounting which is in turn supported by a bracket or the like arranged to be fixed relative to the body under control. The apertured mounting device exposes two opposed surfaces of the thermistor, whereupon a terminal screw carried by the bracket bears against one surface of the exposed thermistor and presses the other exposed surface into contact with the controlled body. One of the conductors of the control circuit may be attached to the terminal screw and where the body under control is of metal the other of the conductors may be attached to the body itself. By mounting the thermistor in such a carrier it can be handled and assembled into the completed structure without danger of damage or accidental loss and it is most convenient for replacement or service under field conditions.

In the accompanying drawings:

FIGURE 1 is a front elevational view of a cooking kettle equipped with a temperature sensing device embodying my inventions; portions of the casing being broken away;

FIGURE 2 is an enlarged partially sectional view of a portion of the cooking kettle showing the attachment of the temperature sensing device thereto;

FIGURE 3 is a sectional view of the temperature sensing device taken on lines 3—3 of FIGURE 2;

FIGURE 4 is a side sectional elevation of a second form of temperature sensing device embodying the invention; and FIGURE 5 is a portion of a control circuit showing the thermistor as a component thereof.

FIGURE 1 shows an electric cooking kettle, 1, of the type more particularly described and claimed in the United States Letters Patent of Harold A. Michaelis, No. 2,912,557, for "Electric Cooking Appliance" and assigned to my present assignee. Said appliance comprises a heavy aluminum kettle 2 the lower portion of which is spherical and has attached thereto an electrical heating element 3 of the familiar metal sheath resistance type such as shown in Vogel Patent 2,490,934 granted December 13, 1949, for "Electric Heater." The heating element is arranged spirally about the spherical bottom portion of the kettle and is brazed or otherwise secured to the kettle in good heat transfer relationship. A jacket 4 accommodates thermal insulation. By means of a bracket (not shown) attached to the lower portion of the kettle the kettle structure is arranged to pivot about a tubular shaft 5 fixed to a sturdy box-like structure 6 secured to a front corner of a heavy box-like base 7 whereupon by means of a handle 8 the shaft may tilt the kettle when necessary to pour soup stock, or the like, which may have been cooked therein. The center of gravity is in such relationship to the shaft 5 that the kettle normally assumes an upright position resting on the pedestal 9. The tubular shaft 5 accommodates the electrical leads serving the heating unit and control device and provides a convenient means for bringing said leads into the box-like structure 6 and the base 7 each of which accommodate portions of the electrical control system as fully described in the said Michaelis patent.

The control device 10 embodying the invention is secured to the bottom of the kettle in any convenient location and is best understood from FIGURE 2. The actual temperature sensing element 11 is a thermistor disk of the size previously mentioned, namely, about 0.1 inch in diameter and 0.05 inch in thickness. The thermistor has a high negative temperature coefficient of resistance and may be of ceramic-like composition consisting of sintered aluminum oxide and an oxide of magnesium, manganese, titanium, iron, nickel, cobalt zinc, etc. For example, the thermistor 11 may have the high negative temperature coefficient of resistance corresponding to a resistance rate of change of minus 0.044 ohm per ohm per degree centigrade whereby the characteristic of the thermistor may be as follows:

| Temperatures degrees C.: | Total resistance (ohms) |
|---|---|
| 25 | 100,000 |
| 50 | 34,000 |
| 100 | 6,000 |
| 150 | 1,700 |
| 200 | 580 |

The disk-like thermistor is placed within an aperture formed in the bottom wall of a sleeve 12 molded from an elastic insulation material such as a suitable silicone rubber compounded to withstand temperatures of over 200° C. without deterioration or loss of elasticity. The bottom wall thickness of the sleeve 12 is preferably slightly less than the thickness of the disk-like thermistor and the aperture in said bottom wall is slightly undersized, whereupon the bottom wall structure will elastically grip the thermistor and the lower face of the thermistor will project slightly below the bottom of the sleeve. The sleeve is fitted over the enlarged end of portion 14 of a metal terminal 15, said terminal having a rounded end which bears against the exposed upper surface of the disk 11 as clearly appears. The threaded portion 16 of the stud is of reduced diameter as respects the portion 14 whereby to provide a shoulder 17. The threaded end is passed through an opening in a channel shaped metal bracket 18 and is insulated therefrom by means of the insulated washer assembly 20 which may be formed of mica or other suitable insulation which is temperature resistant and of itself a thermal barrier between the terminal 15 and the bracket 18. The electrical conductor 21 is connected to the terminal 15 by means of the nut 22 and lock washer 23 whereby said connection is very simply and adequately made. The insulated washer assembly 20 insulates the conductor from the bracket 18.

The bracket 18 is secured to the kettle wall by means such as machine screws 26 passing through the feet 27 of the bracket. One of the screws provides for the connection of the second electrical lead wire 24 as shown, whereby it will be obvious that the thermistor 11 is in series with the two leads 21 and 24, the metal of the kettle forming a portion of the latter conductive path. The kettle wall is massive, being of the order of one-half inch thick, and the electrical resistance thereof is negligible in the thermistor circuit.

In view of the fact that the bracket 18 is of fixed height and the threaded extension 16 passes freely through the insulating washer assembly 20, it may be necessary to interpose a mica shim 25 between the shoulder 17 and the underside of the washer assembly 20 whereby to insure that the rounded end of the terminal portion 14 urges the thermistor disk firmly into good surface contact with the kettle wall thus maintaining optimum conditions of heat transfer relationship and electrical conductivity relationship between the thermistor disk and the kettle wall.

In the embodiment of FIGURE 4 the thermistor disk 11 is positioned within an opening in a strap-like member 30 which also may be formed of silicone rubber. Said member 30 is affixed to a Z-shaped bracket 31 preferably by the illustrated insulating washer whereby to prevent the transmission from the thermistor to the bracket of any leakage currents which may result from the accumulation of dirt or moisture on the strap-like member 30. The terminal 15 is insulated from bracket 31 by the insulating washer assembly 20 previously identified; and the fastening of the bracket to the wall of the controlled body 32 is accomplished by the machine screw 33 and the insulation assembly 34 which electrically insulates the screw from the bracket and the bracket from the metal body 32. The electrical connections are made as previously described. In the FIGURE 4 embodiment the Z-shaped bracket may be resilient and biased in the direction of the body 32 whereby to maintain the terminal 15 under resilient pressure to hold the thermistor 11 tightly against the body 32. It may be necessary in this embodiment also, to employ the mica spacing washer 25.

FIGURE 5 illustrates a portion of the electrical control system fully described in the said Michaelis Patent No. 2,912,557. Specifically, FIGURE 5 illustrates the temperature adjustment portion of said system, said portion being accommodated within the box-like pedestal 6. As indicated, there are actually two control sections; a section 60 which establishes the operating temperature of the kettle 1 in the boiling temperature range of from about 160° F. to 200° F., and a section 63 which establishes the operating temperature of the kettle in a full temperature range of about 100° F. to 450° F. The single pole double throw switch 66 provides for optional selection of the desired temperature range.

The section 60 includes an adjustable resistor 61 provided with a cooperating adjustable wiper mounted on a shaft having a setting knob 62 which may be manually rotated relative to a suitable index marker. The advantage of the section 60 is that it makes possible to space widely the calibration markings on the dial thus facilitating the selection of the control temperature. Similarly the section 63 comprises an adjustable resistor 64 provided with a cooperating adjustable wiper mounted upon a rotatable shaft that may be selectively set by the manually rotatable dial 65. The selector switch 66 comprises a contact arm operable between a lower position engaging a contact connected to the wiper of resistance 64 and an upper position engaging a contact connected to the wiper of resistor 61. The resistor 61 is in series with a resistor R5 and the resistor 64 is in series with a resistor R6. It will now be apparent that the thermistor 11 comprises a resistance element in one leg of a Wheatstone bridge circuit having a pair of input terminals 91 and 92 and a pair of output terminals 93 and 94. The input terminal 91 is connected by way of the thermistor 11 and its associated leads 21 and 24 to the output terminal 94 and the input terminal 92 is connected by way of the resistor R7 to the output terminal 94. The input terminal 91 is connectable by way of the resistor R6 and the resistance 64 and the selector switch 66 to the output terminal 93; and optionally the input terminal 91 is connectable by way of the resistor R5 and the resistance 61 and the selector switch 66 to the output terminal 93. Finally the input terminal 92 is connected by way of the resistance R8 to the output terminal 93 thus completing the four legs of the Wheatstone bridge. The respective input terminals are connected by the conductors 81 and 82 to a suitable source of electric energy (not shown). The output terminal 93 is connected directly to ground while the output terminal 94 is isolated from ground potential as shown. The output lead 96 is connected to a suitable amplifier circuit (not shown) by means of which a contactor or relay (not shown) is caused to cycle the heating element 3 according to the condition of unbalance of the Wheatstone bridge as the thermistor changes its resistance with the changing temperature of the kettle wall. It is contemplated that the amplifier system would embody a vacuum tube amplifier circuit whereupon the output conductor 96 would be connected to the control grid of a vacuum tube (not shown). However other amplifier types such as a magnetic amplifier are suitable for use with the bridge circuit above described.

It will be apparent from the foregoing description that the invention provides maximum facility for the handling and mounting of minute sensing elements such as thermistors and for the easy connection thereof into an electrical control circuit. The combination mounting and terminal means eliminates the necessity of soldering or otherwise connecting fine wire leads to the thermistor and permits the removal of the thermistor without danger of damage to the thermistor or its associated connections. The flexible mounting for the thermistor, and the rounded end of the respective terminals 15, make the thermistor inherently self-adjustable to irregular surfaces of the body with which it is maintained in contact.

While there has been described what is at present considered to be the preferred embodiment of the invention, it will be understood that various modifications may be made therein, and it is intended to cover in the appended claims all such modifications as fall within the scope of the invention.

I claim:
1. A temperature-sensitive device, comprising a bracket member mounted in fixed relation to a body subject to temperature change, a temperature responsive element comprising a unitary disk having known relationship between its temperature and resistance characteristics, a resilient member of insulating material having an orifice accommodating said element to elastically secure the same with at least one of its surfaces exposed to said body, a screw-threaded member insulatedly carried by said bracket and bearing directly against said temperature-responsive element to maintain the said exposed surface of said disk in good heat exchange relation to said body, and means including said screw-threaded member and said bracket for connecting said temperature-sensitive element in series relation in an electric circuit.

2. A temperature sensitive device according to claim 1 in which said resilient insulating member comprises a sleeve about said screw-threaded member with the temperature-sensitive element in coaxial relation therewith.

3. A temperature-sensitive device comprising a temperature-responsive element having physical characteristics predictably responsive to the change in temperature of a body, a resilient carrier, pocket means on said carrier receptive to the insertion therein of said temperature-responsive element for frictionally gripping the same to secure it against accidental separation therefrom, said carrier means, further, leaving a portion of said temperature-responsive element in an exposed position projecting therefrom, and means including a rigid member fixed relative to said body and bearing against said temperature responsive element to urge the said exposed surface thereof into firm contact with said body.

4. A temperature-sensitive device comprising a temperature-responsive element, a resilient carrier frictionally gripping said element in a manner exposing opposed surfaces of said element, bracket means fixed to a body subject to temperature change, rigid means extending from said bracket into engagement with one of the exposed surfaces of said temperature responsive element, and means for biasing said rigid means to cause the same to urge the temperature responsive element into firm engagement of the other side thereof with the said body.

5. A temperature sensitive device according to claim 4 in which the said bracket member is resiliently biased toward said body.

6. A temperature sensitive device according to claim 4, in which said rigid means is thermally insulated from said bracket means.

7. A temperature-sensitive device, comprising a bracket member mounted in fixed relation to a body subject to temperature change, a temperature-responsive, electrically-conductive, element having known temperature-resistance characteristics, a body of insulating material having wall means elastically gripping said element with a surface of said element exposed to said body, means carried by said bracket member and mechanically engaging said element to urge said temperature-responsive element into direct heat exchange engagement with said body, means for insulating said element-engaging means from said bracket member, means for connecting said element-engaging means from said bracket member, and means for connecting said element in an electric circuit, in which said body of insulating material comprises a strap fixed at one end to said bracket member.

References Cited in the file of this patent

UNITED STATES PATENTS

| 2,484,585 | Quinn | Oct. 11, 1949 |
| 2,806,122 | Thunander | Sept. 10, 1957 |
| 2,912,557 | Michaelis | Nov. 10, 1959 |

FOREIGN PATENTS

| 465,614 | Great Britain | May 10, 1937 |
| 747,828 | Great Britain | Apr. 18, 1956 |